US009225977B2

(12) United States Patent
Lewinnek et al.

(10) Patent No.: US 9,225,977 B2
(45) Date of Patent: Dec. 29, 2015

(54) MATRIX TESTING TARGETS

(71) Applicant: Teradyne, Inc., North Reading, MA (US)

(72) Inventors: David Walter Lewinnek, Somerville, MA (US); Eric L. Truebenbach, Sudbury, MA (US)

(73) Assignee: Teradyne, Inc., North Reading, MA (US)

( * ) Notice: Subject to any disclaimer, the term of this patent is extended or adjusted under 35 U.S.C. 154(b) by 0 days.

(21) Appl. No.: 13/776,076

(22) Filed: Feb. 25, 2013

(65) Prior Publication Data

US 2014/0240519 A1  Aug. 28, 2014

(51) Int. Cl.
*H04N 17/02* (2006.01)
*H04N 5/225* (2006.01)
*H04N 17/00* (2006.01)

(52) U.S. Cl.
CPC ........... *H04N 17/002* (2013.01); *H04N 5/2257* (2013.01)

(58) Field of Classification Search
CPC ... H04N 1/6033; H04N 17/002; G06T 7/0018
USPC ..................... 348/187, 188, 92, 86
See application file for complete search history.

(56) References Cited

U.S. PATENT DOCUMENTS

| 7,499,600 | B2 | 3/2009 | Ojanen et al. | |
|---|---|---|---|---|
| 2002/0122113 | A1* | 9/2002 | Foote | 348/48 |
| 2004/0189812 | A1 | 9/2004 | Gustavsson et al. | |
| 2005/0231596 | A1 | 10/2005 | Marchese | |
| 2006/0001925 | A1* | 1/2006 | Tatarczyk | 358/509 |
| 2006/0077259 | A1* | 4/2006 | Knoedgen et al. | 348/187 |
| 2006/0103754 | A1 | 5/2006 | Wenstrand et al. | |
| 2010/0127078 | A1 | 5/2010 | Brock et al. | |
| 2010/0271503 | A1* | 10/2010 | Safaee-Rad et al. | 348/223.1 |
| 2012/0169842 | A1* | 7/2012 | Chuang et al. | 348/39 |
| 2013/0317650 | A1 | 11/2013 | Jenkinson et al. | |
| 2014/0340680 | A1 | 11/2014 | Montminy et al. | |

FOREIGN PATENT DOCUMENTS

| JP | 2009-100260 | 5/2009 |
|---|---|---|
| KR | 10-2005-0073069 | 7/2005 |
| KR | 10-2009-0012612 | 2/2009 |
| KR | 10-2009-0028011 | 3/2009 |

(Continued)

OTHER PUBLICATIONS http://www.the-digital-picture.com/Help/ISO-12233.aspx (downloaded Feb. 12, 2014).

(Continued)

*Primary Examiner* — Michael Teitelbaum
(74) *Attorney, Agent, or Firm* — Fish & Richardson P.C.

(57) ABSTRACT

An example system for testing camera modules includes: a structure for holding camera modules under test, where each of the camera modules includes an image sensor, and where the camera modules are arranged in a same plane on the structure and offset from each other in the plane; and a target for use in testing the camera modules concurrently, where the target includes multiple tiles that are repeated, where each tile contains information for use in testing a camera module, and where the camera modules and the tiles are arranged so that different camera modules face different tiles but see at least some of the same information at the same angle.

20 Claims, 7 Drawing Sheets

(56) References Cited

FOREIGN PATENT DOCUMENTS

| KR | 10-2011-0051970 | 5/2011 |
|---|---|---|
| KR | 10-2012-0052595 | 5/2012 |

OTHER PUBLICATIONS

Notice of Allowance in U.S. Appl. No. 13/775,919, mailed Dec. 8, 2014, 18 pages.
International Search Report and Written Opinion mailed May 22, 2014 in international application No. PCT/US2014/015814, 12 pgs.
Machine translation of KR-10-2012-0052595, 9 pgs.
Machine translation of KR-10-2009-0012612, 16 pgs.
Machine translation of KR-10-2005-0073069, 7 pgs.
Machine translation of KR-10-2009-0028011, 12 pgs.
Machine translation of KR-10-2011-0051970, 16 pgs.
Machine translation of JP-2009-100260, 14 pgs.
International Search Report and Written Opinion mailed May 22, 2014 in international application No. PCT/US2014/015924, 14 pgs.

* cited by examiner

FIG. 7C
IMAGE SEEN BY MODULES 1 AND 4

FIG. 7D
IMAGE SEEN BY MODULES 2 AND 3

MATRIX TESTING TARGETS

TECHNICAL FIELD

This patent application relates generally to matrix testing targets that may be used, e.g., to test camera modules or other optical devices.

BACKGROUND

Camera modules are integrated into numerous devices, including mobile telephones, tablet computing devices, and laptop computers. A camera module typically includes one or more rectangular image sensors. In some types of testing, an image of a testing target is focused on the image sensor, and the resulting image is measured for compliance with applicable standards to determine whether the image module is functioning properly. For example, an ISO-12233 standard testing target may be used to measure image sharpness. In this example, a camera module may be tested by exposing the camera module to the ISO-12233 standard testing target, and then measuring the sharpness of the image that results or measuring the contrast of certain sections of the image.

SUMMARY

An example system for testing camera modules may include a structure for holding camera modules under test, where each of the camera modules includes an image sensor, and where the camera modules are arranged in a same plane on the structure and offset from each other in the plane. The example system may also include a target for use in testing the camera modules concurrently, where the target includes multiple tiles that are repeated, where each tile contains information for use in testing a camera module, and where the camera modules and the tiles are arranged so that different camera modules face different tiles but see at least some of the same information at the same angle. The example system may also include one or more of the following features, either alone or in combination.

The tiles may be configured to test image sharpness. The tiles may be configured to test one or more colors of an image. The camera modules may be arranged in a one-dimensional array on the structure. The camera modules may be arranged in a two-dimensional array on the structure. The tiles may be repeated along a single dimension of the target. The tiles may be repeated along two dimensions of the target. Each tile may comprise parts of an ISO-12233 sharpness testing target, with the parts corresponding to a type of the camera modules.

The structure may be rotatable. An axis of rotation of the structure may be parallel to a ground plane. An axis of rotation of the structure may be perpendicular to a ground plane. The structure may be part of a linear test system.

Different tiles may contain different information. The tiles with different information may be arranged in one or more patterns so that the different camera modules can see at least parts of patterns of tiles containing the same information at the same angle. All tiles may contain the same information.

An example method for testing camera modules may include arranging the camera modules on a structure such that image sensors of at least some of the camera modules face corresponding targets, where at least two of the camera modules face a single target; where the single target comprises multiple tiles that are repeated, where each tile contains information for use in testing a camera module, and where the tiles are arranged so that the at least two camera modules face different tiles but see at least some of the same information at the same angle. The example method may also include moving the at least two camera modules away from the single target; and moving at least two other camera modules in place of the at least two camera modules so that the at least two other camera modules face the single target. The example method may also include one or more of the following features, either alone or in combination.

Moving the at least two camera modules and the at least two other camera modules may include moving the structure so that the at least two camera modules move away from the single target and so that the at least two other camera modules move in place of the at least two camera modules.

The tiles may be configured to test image sharpness. The tiles may be configured to test one or more colors of an image. The at least two camera modules may be arranged in a one-dimensional array on the structure. The at least two camera modules may be arranged in a two-dimensional array on the structure. The tiles may be repeated along a single dimension of the target. The tiles may be repeated along two dimensions of the target. Each tile may comprise parts of an ISO-12233 sharpness testing target, where the parts correspond to a type of the at least two camera modules.

The structure may be rotatable. An axis of rotation of the structure may be parallel to a ground plane. An axis of rotation of the structure may be perpendicular to a ground plane. The structure may be movable linearly.

Different tiles may contain different information. The tiles with different information may be arranged in one or more patterns so that the different camera modules can see at least parts of patterns of tiles containing the same information at the same angle. All tiles may contain the same information.

An example target for testing camera modules may include multiple tiles that are repeated in one or more dimensions, where each tile contains information for use in testing a camera module, and where the tiles are arranged relative to each other so that different camera modules can face different tiles but see at least some of the same information at the same angle. The example target may also include one or more of the following features, either alone or in combination.

The tiles may be configured to test image sharpness. The tiles may be configured to test one or more colors of an image. The camera modules may be arranged in a one-dimensional array on a structure. The camera modules may be arranged in a two-dimensional array on a structure. The tiles may be repeated along a single dimension of the target. The tiles may be repeated along two dimensions of the target. Each tile may include parts of an ISO-12233 sharpness testing target, the parts corresponding to a type of the camera modules.

Different tiles may contain different information. The tiles with different information may be arranged in one or more patterns so that the different camera modules can see at least parts of patterns of tiles containing the same information at the same angle. All tiles may contain the same information.

Any two or more of the features described herein, including in this summary section, may be combined to form embodiments not specifically described herein.

Parts of the foregoing may be implemented as a computer program product comprised of instructions that are stored on one or more non-transitory machine-readable storage media, and that are executable on one or more processing devices. All or part of the foregoing may be implemented as an apparatus, method, or system that may include one or more processing devices and memory to store executable instructions to implement functionality.

The details of one or more examples are set forth in the accompanying drawings and the description below. Further features, aspects, and advantages will become apparent from the description, the drawings, and the claims.

DETAILED DESCRIPTION

Described herein is a test system for testing optical devices, such as camera modules. Generally, a camera module includes one or more image sensors and an interface for communicating with external electronics. Generally, an image sensor is a device for converting an optical image into an image signal. A camera module may also include a lens assembly. A lens assembly includes at least one lens, and may also, but need not, include filters, focusing motors, and other optics. The lens assembly may have a non-variable (or "fixed") focus or it may have a variable focus.

The test systems described herein are usable to test any appropriate type of camera modules including, but not limited to, camera modules that may be incorporated into digital cameras, mobile telephones, tablet computing devices, and laptop computers. The test systems, however, are not limited to use with testing camera modules, and may be used to test other types of optical devices.

Standard testing targets, such as an ISO-12233 standard testing target, include various features that may be imaged by a camera module in order to test the sharpness of the camera module. Although the example test systems described herein are described in the context of an ISO-12233 standard testing target, the test systems may be used with any appropriate testing target.

Standard sharpness testing targets, such as the ISO-12233 testing target, can be used to measure a large range of sharpness values. When testing a camera module in production, only a narrow range of sharpness values may be useful for a particular type of camera module. For example, if a camera typically has about 550 line-pairs-per-picture-height (lp/ph) at its edges and 650 lp/ph in its center, testing for that camera module requires measuring only about 500 to 700 lp/ph. However, the ISO-12233 standard testing target may be used to measure 100 to 2,000 lp/ph. As such, the ISO-12233 standard testing target may be used to test camera modules having a wide range of line-pairs-per-picture-height. However, for a particular camera module in question (e.g., the one having about 550 lp/ph at its edges), the areas of the ISO-12233 standard testing that are useful for testing (e.g., that measure 500 to 700 lp/ph) constitute less than 3% of the total area of the ISO-12233 testing target image. Since a production tester for a specific camera module with a specific resolution only cares about a small fraction of the ISO test chart, a testing target can be generated that concentrates on this small fraction. This testing target can be made of a matrix of many identical smaller images or patterns, with each image containing, e.g., only the desired parts of the ISO-12233 standard image.

In this regard, during testing, camera modules are held on a structure and face testing targets. The camera modules capture images of the testing targets, and electronics associated with the test system process those images to determine whether the camera modules meet applicable standards. This may be done, e.g., by determining if the captured image properly distinguished between appropriate lines or patterns on the testing target. Some camera module test systems position camera modules linearly, and test the camera modules in assembly-line fashion. An illuminator, either in front of or behind each camera module, illuminates a testing target in front of the camera module. A camera module is tested using images taken of a testing target, and then proceeds to a next test station along the line for a next test using another testing target. The camera module and testing targets require an exclusive truncated square pyramidal area between each module and target. This is due to the conical nature of a lens' field of view and the rectangular image sensor within the camera module.

Figure 1:
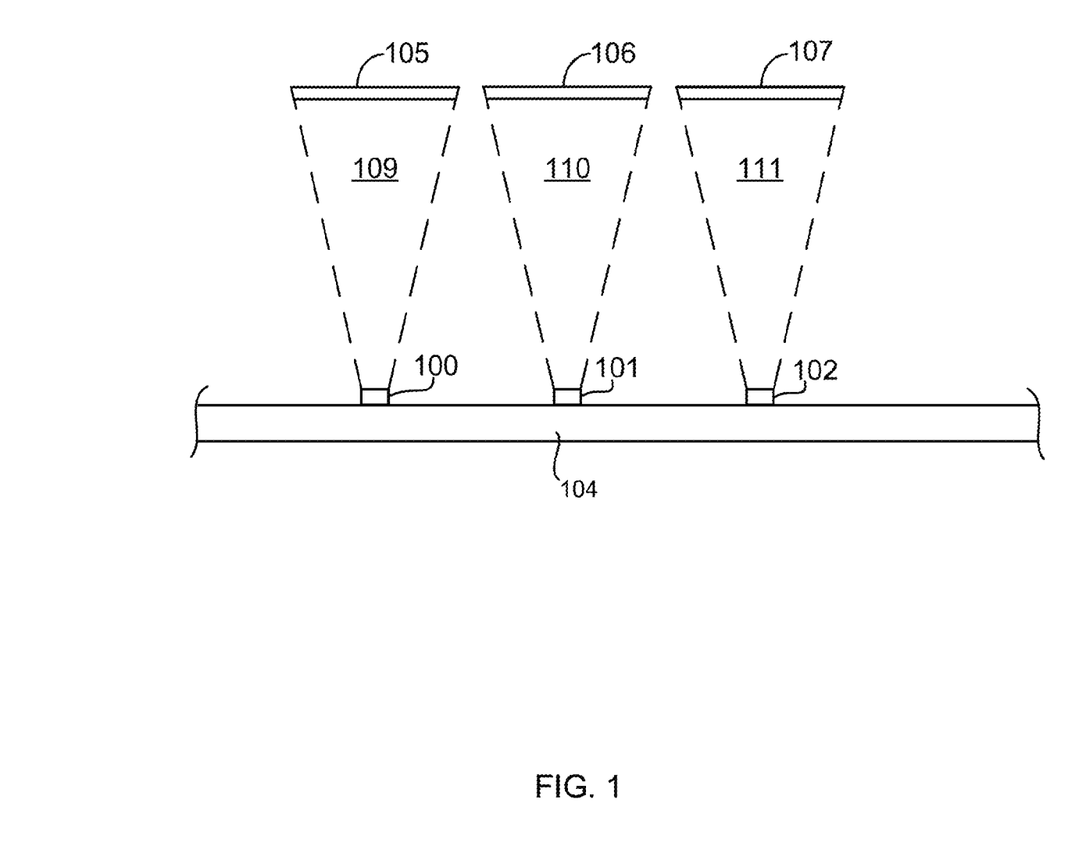
FIG. 1 is block diagram of a linear camera module testing system.

In an example implementation, as shown in FIG. 1, camera modules 100, 101 and 102 are on testing line 104 and face targets 105, 106 and 107. The testing targets are stationary, and testing line 104 operates like a conveyor belt, moving camera modules from target-to-target. Areas of non-interference 109, 110, and 111 (called "keep-out areas") are required between the camera modules and targets in order to ensure that testing is performed accurately. The testing targets may be mounted on any appropriate structure such that the plane of each testing target is perpendicular to the optical axis of a lens in the lens assembly of a corresponding camera module. For some image sensors that have planar surfaces, this may be achieved by mounting the testing targets so that the plane of each camera image sensor is parallel to, or substantially parallel to, the plane of each corresponding target.

In other types of camera module test systems, such as those described in U.S. patent application Ser. No. 13/775,919, filed concurrently herewith and entitled "Rotatable Camera Module Testing System", the camera modules are mounted on a wheel, with testing targets arranged around the wheel perimeter.

Figure 2:
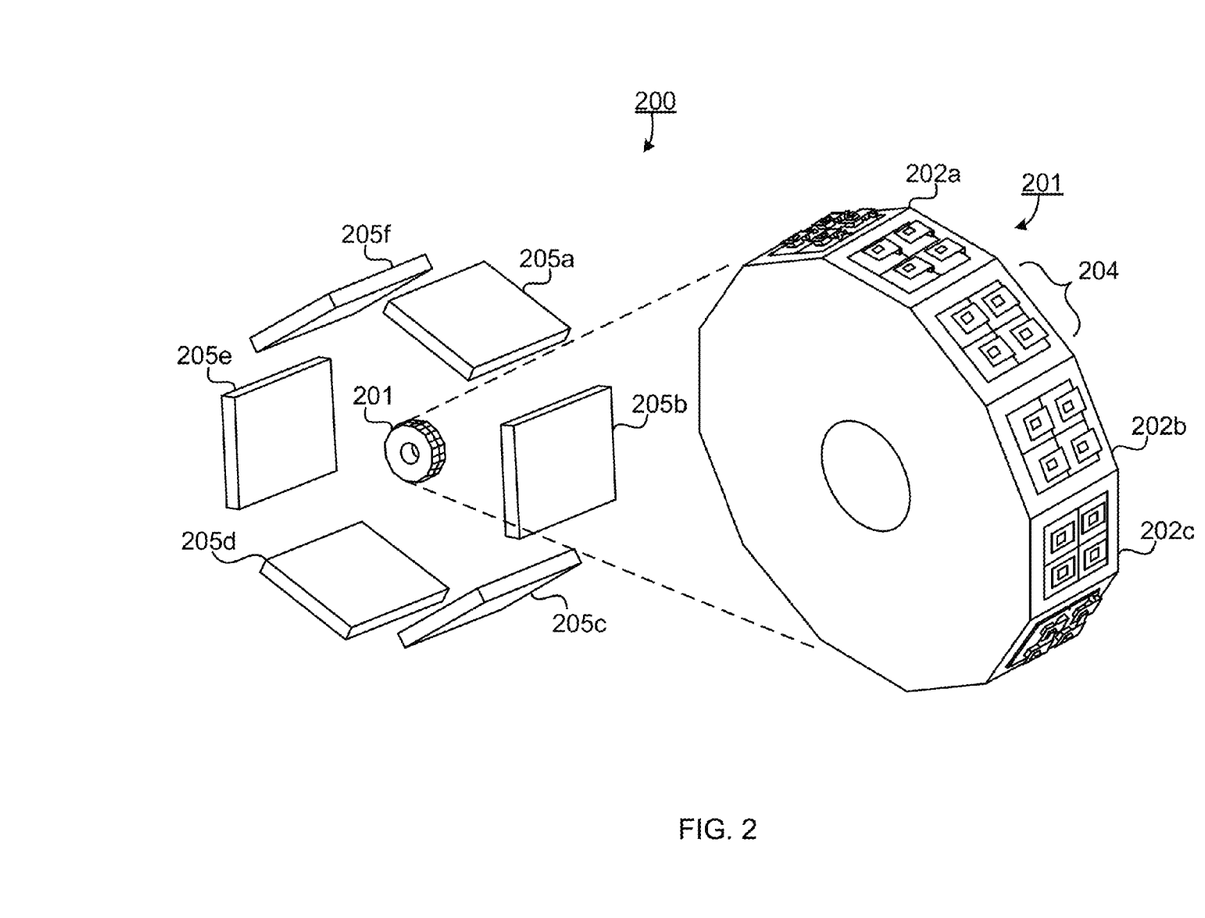
FIG. 2 is block diagram of a wheel-type camera module testing system.

FIG. 2 shows an example implementation of a portion of an example test system 200 from the "Rotatable Camera Module Testing System" application. The example of FIG. 2 includes a polygonal structure, or "wheel" 201, having multiple circumferential faces 202a, 202b, 202c, etc. on which camera modules may be mounted for testing.

In the implementation of FIG. 2, wheel 201 is a wheel with twelve equal chamfers (faces) along its circumferential surface that are configured to hold camera modules, although the test system is not limited to use with a wheel having twelve faces. In the example implementation shown in FIG. 2, wheel 201 is configured to hold four camera modules 204 per face, although any number of camera modules can be held on a face. In this example, each camera module includes a rectangular image sensor having a planar surface; however, other types of camera modules do not have planar imaging surfaces.

Surrounding the wheel are testing targets 205a to 205f. Six testing targets are shown; however, any appropriate number may be used. The testing targets may be mounted on any appropriate structure such that that the plane of each testing target is perpendicular to the optical axis of a lens in the lens assembly of a corresponding camera module. As noted, in some examples, this may be achieved by mounting the testing target so that the plane of each camera image sensor is parallel to, or substantially parallel to, the plane of each corresponding target.

The wheel turns at a rate controlled by electronics that is either local to, or remote from, the wheel. In this context, electronics is deemed local to the wheel if the electronics is within a volume defined by the testing targets, and remote from the wheel if the electronics is external to a volume defined by the testing targets. The manner in which the wheel turns is typically not continuous, but rather the wheel indexes, or "clicks", so that camera modules mounted on each face of the wheel spend time at each test station. In this context, a test station is a point in space, through which the wheel turns, at which a test may be performed. As described below, different tests may be performed at different test stations, some involving targets like those shown in the figures, and others not. The testing targets are typically stationary, allowing camera modules to pass from target-to-target for different tests as the wheel is indexed.

Figure 3:
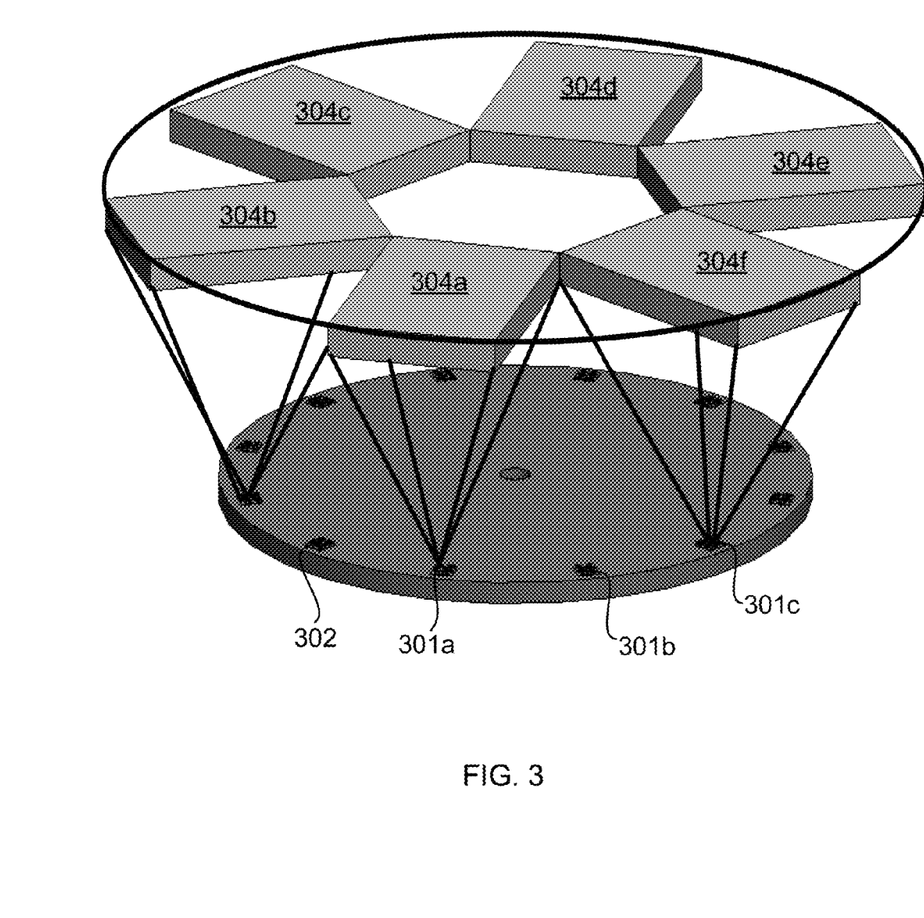
FIG. 3 is a block diagram of a turntable-type camera module testing system.

FIG. 3 shows an example implementation of a portion of a test system that includes a turntable wheel that rotates horizontally. More specifically, as shown in FIG. 3, camera modules 301a, 301b, 301c, etc. are mounted on wheel 302, which rotates around a vertical axis (perpendicular to the ground plane). Testing targets 304a to 304f are mounted relative to different test stations on the wheel, so that tests may be performed on the camera modules at those test stations. As was the case above, the testing targets may be mounted on any appropriate structure such that the plane of each testing target is perpendicular to the optical axis of a lens in the lens assembly of a corresponding camera module. In some examples, this may be achieved by mounting the testing target so that the plane of each camera image sensor is parallel to, or substantially parallel to, the plane of each corresponding target. As was also the case above, the manner in which the turntable wheel turns is typically not continuous, but rather the wheel indexes, or "clicks", so that camera modules mounted on the wheel spend time at each test station. In the example of FIG. 3, different test stations may be used to perform different testing. One or more of the test stations may be left unfilled. One or more of the test stations may be reserved for loading and/or unloading, and so forth.

In both linear test systems and rotatable test systems, testing multiple camera modules in parallel using a single target can save time and money. Unfortunately, it is difficult to test multiple camera modules in parallel using standard testing targets because each camera module should see the same image at the same angle in order to achieve appropriate correlation. It can be important that each module see the same image because sharpness of many lenses varies with the distance from the optical center of a lens so that the edges of a picture typically have less sharpness than the center (although, for some automotive applications with lane-viewing cameras, lens assemblies are designed so that the lens' edges have more sharpness than the center).

Accordingly, using standard testing targets, camera modules are tested individually—one camera module per target. This is required so that each camera module see the relevant information at the appropriate angle and distance. Testing modules one-by-one can be inefficient and time consuming. Therefore, as described herein, a "matrix" testing target can be constructed of multiple tiles, each having an identical image or being part of a repeated pattern. That way, adjacent camera modules can capture images containing at least some of the same information (e.g., identical images) from the same angle, even though each camera will be looking at a slightly different part of the overall testing target. The example matrix testing targets described herein may be used to test multiple camera modules using the same target on any appropriate test system, including both linear ("assembly line") and rotatable test systems. As such, the example matrix testing targets described herein may reduce the time and cost associated with testing camera modules.

Figure 4:
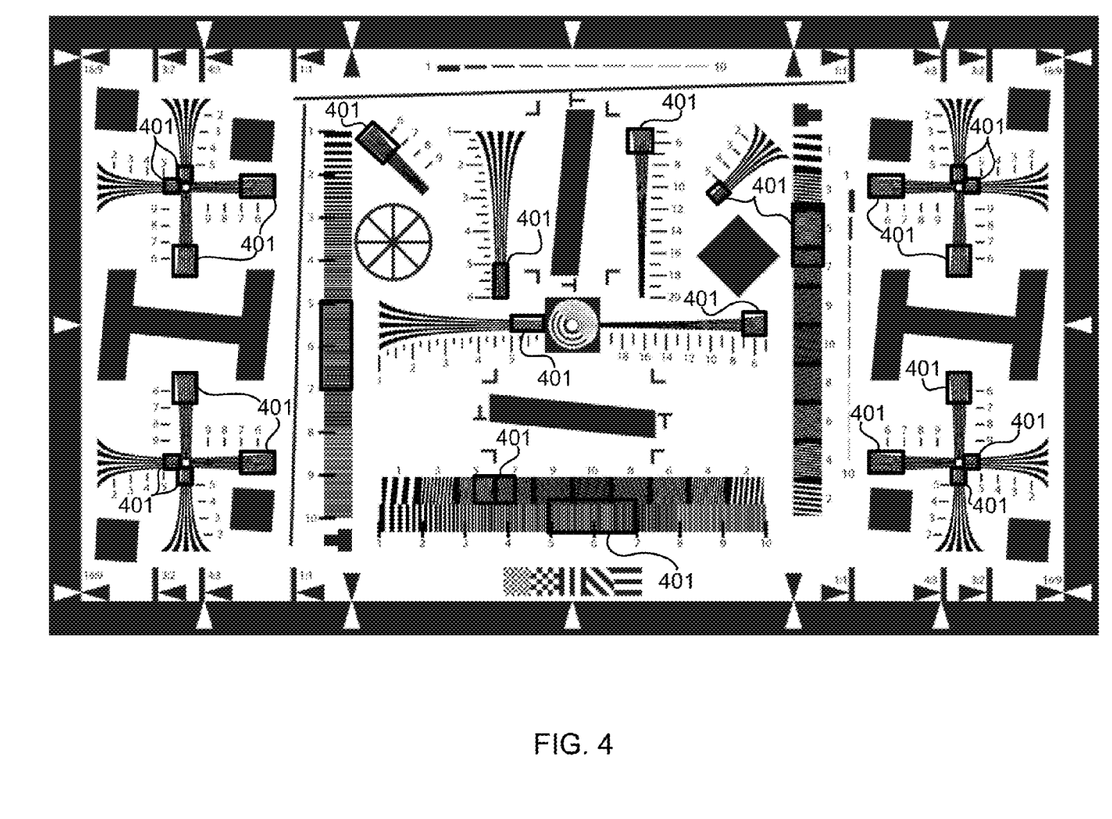
FIG. 4 shows an annotated ISO-12233 standard testing target.

FIG. 4 shows an example of an ISO-12233 standard testing target, which has been annotated. The annotations 401 represent portions of the testing target that may be used to test a camera module for sharpness in the 500 to 700 lp/ph range. As indicated above, and as is evident from the annotations, the majority of the ISO-12233 standard testing target is not needed to test a camera module over this range of sharpness. Accordingly, the portions of the standard testing target that are needed to test a particular type of camera module are extracted and combined into a single image to produce a testing target tile that is considerably smaller than the standard testing target (e.g., 10%, 9%, 8%, 7%, 6%, 5%, 4% or less of the standard testing target size). For example, the annotated portions of the ISO-12233 standard testing target of FIG. 4 may be extracted to produce a testing target tile for use in testing a sharpness range of 500 to 700 lp/ph (e.g., only that sharpness range). That tile may be repeated in an appropriate manner to generate a matrix testing target that may be used to perform sharpness, contrast, or other testing on multiple (e.g., adjacent) camera modules in parallel.

Accordingly, in an example implementation, a matrix testing target includes multiple tiles that are repeated, with each tile containing only information for use in testing a particular optical property (e.g., a particular sharpness range). The camera modules and the tiles of the matrix testing target are arranged relative to each other so that different camera modules face different tiles but see at least some of the same information at the same angle and distance. For example, the camera modules may be arranged adjacent to each other in a same plane on a structure (e.g., a wheel, a linear tester, and so forth) and offset from each other in the plane. Because tiles in the matrix testing target are repeated and therefore also offset from one another in the same manner as the camera modules, and because the tiles contain the same information or are part of the same repeated pattern of information, different camera modules in the same plane can view the same information at the same angle and distance. As a result, multiple camera modules can be tested in parallel. The sizes of the tiles may be varied, in some implementations, so that the tiles match offsets of corresponding camera modules.

Figure 5:
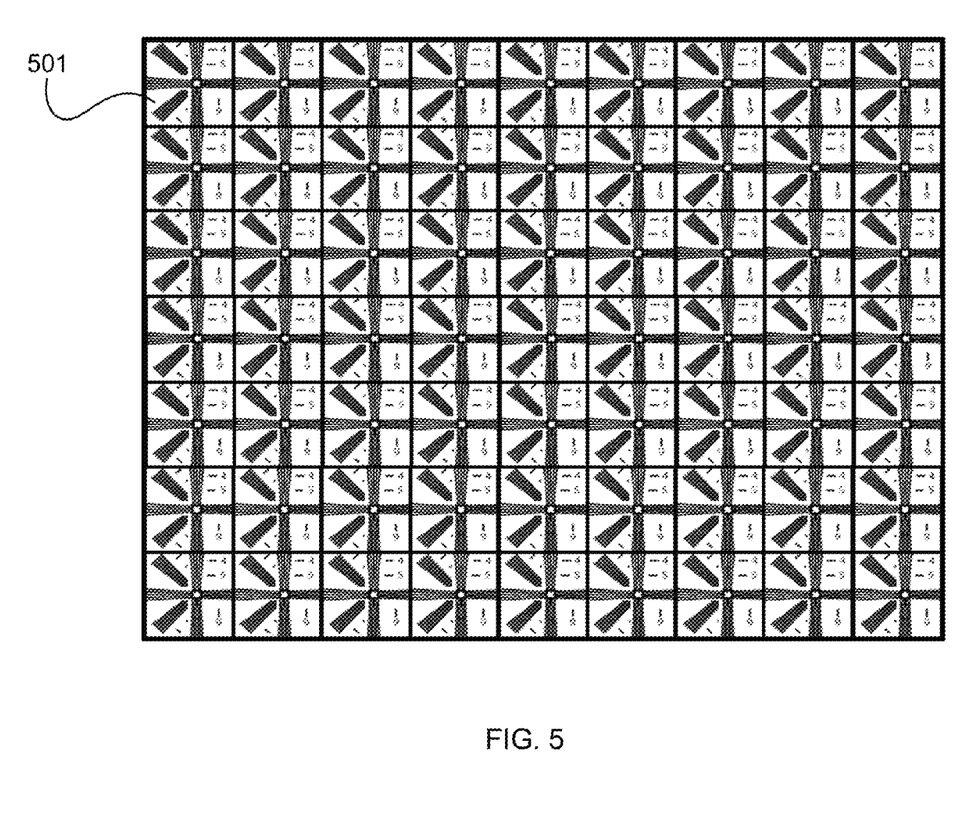
FIG. 5 shows an example matrix testing target.

FIG. 5 shows an example of a matrix testing target. In the example of FIG. 5, tiles 501 are arranged in an N×M matrix (where N and M are each integers greater than or equal to one). The matrix can be one dimensional (linear) or two dimensional. In the example implementation of FIG. 5, each tile 501 contains all information from an ISO-12233 standard testing targets for testing a particular sharpness range (e.g., 500 to 700 lp/ph). In other implementations, each tile may contain a subset of information from a standard testing target for testing the particular sharpness range. In some implementations, a tile may contain information from different standard testing targets, or custom information generated specifically for a particular type of testing. In some implementations, each tile may contain combinations of information from different types of standard testing targets, with or without additional custom information.

In some examples, each tile in the same matrix testing target contains the same information (e.g., for testing a particular sharpness range, contrast, etc.). In some implementations, different tiles in the same matrix testing target may contain different information. For example, one tile may contain information from a first standard testing target (e.g., the ISO-12233 standard testing targets) and a second, adjacent tile may contain information from a second standard testing target for testing the same, or different, properties of the camera module as the information in the first tile. In implementations where individual tiles contain different information, the tiles may be patterned in a manner that allows adjacent camera modules to view at least some of the same information (e.g., the same pattern of tiles) from the same angle and distance (even though those camera modules are capturing images from different sets of tiles). In some implementations, the tiles may be patterned so that different cameras see enough of the different tiles to enable whatever type of testing is performed using the different tiles.

Figure 6:
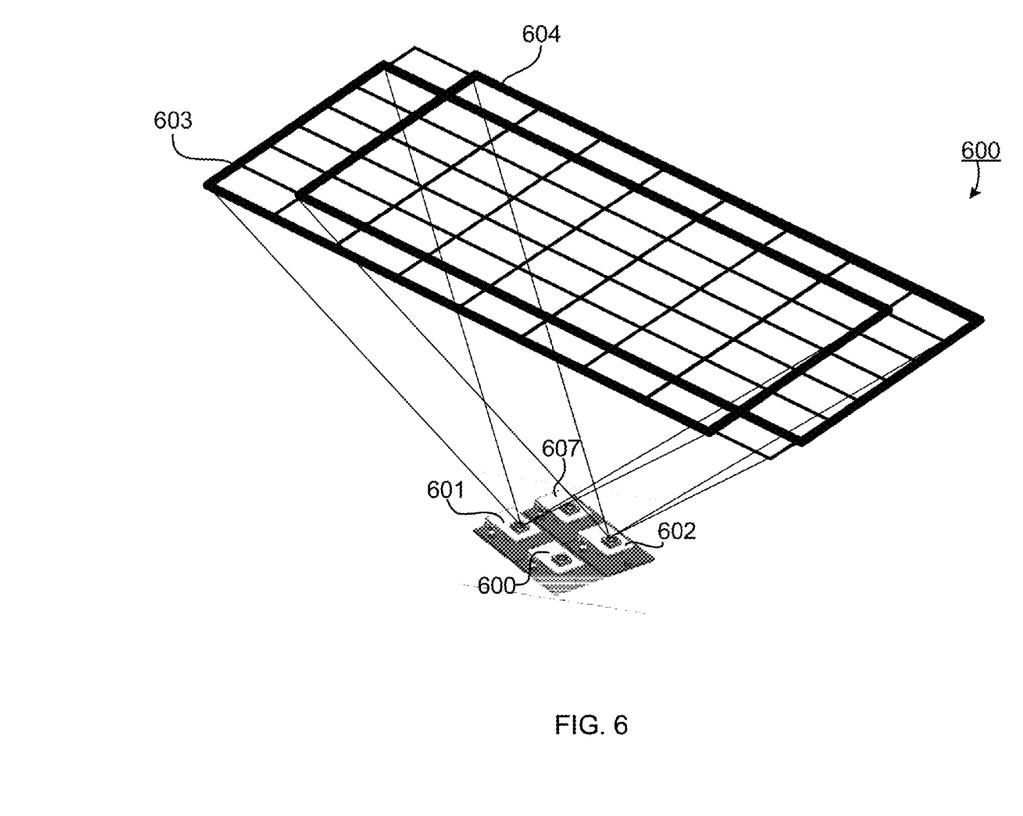
FIG. 6 is a block diagram showing a portion of a camera module testing system with adjacent camera modules facing the same matrix testing target.

FIG. 6 shows an example implementation of a system for testing camera modules in parallel using the matrix testing targets described herein. In the example of FIG. 6, camera module 601 views tiles 603 and camera module 602 views tiles 604. The tiles contain the same information, e.g., either all tiles contain the same information or the individual tiles contain different information but the patterns of tiles that the different camera modules view are the same. The different camera modules view their respective tile sets at the same angle and from the same distances. Since both camera modules are obtaining at least some of (and in some cases all of) the same information (albeit from different tiles in the testing pattern), testing may be performed on both camera modules 601 and 602 in parallel. Although not shown, camera modules 606 and 607 also view corresponding tile sets on matrix target 600, and may be tested in parallel with camera modules 601 and 602. A matrix testing target may be generated so that any number of camera modules may be tested in parallel and in any configuration.

As noted, each testing target may include the same types of tiles containing the same information or different types of tiles not containing the same information. For example, a mixture of two different types of tiles may create two possible images to be captured by a camera module. Testing software may distinguish between these two possible images, and adjust a test program to perform a test using an acquired image. The matrix targets may be generated using one or more computer programs. For example, a computer program may analyze a standard testing target to identify and isolate features thereof for testing a particular optical property (e.g., range of sharpness). Information about a standard testing target may be obtained, e.g., from one or more public or private databases. The computer program may then extract appropriate features from the standard testing target, and generate a tile containing those features. The tile may then be repeated in one or two dimensions, with the number of tiles (and resulting tile size) being dependent upon the configuration of, and number of, camera modules to be tested in parallel.

Figure 7A:
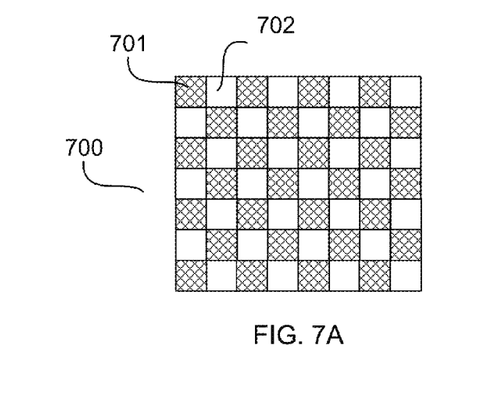
FIG. 7A shows a testing target with different types of tiles.
Figure 7B:
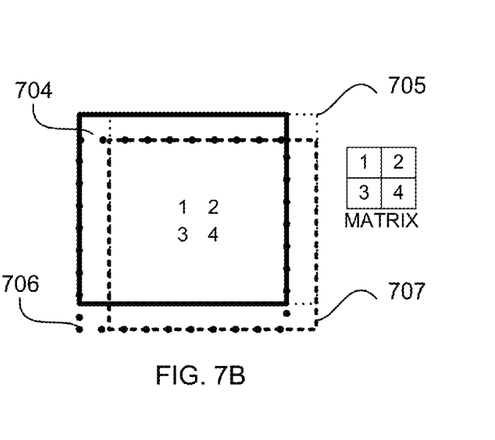
FIG. 7B shows portions of that testing target viewed by different image sensors.
Figure 7C:
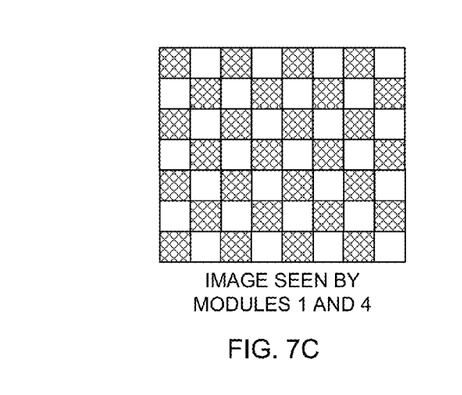
FIGS. 7C and 7D show images viewed by two pairs of sensors.
Figure 7D:
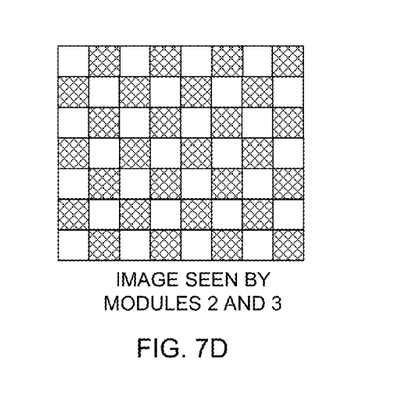

FIGS. 7A to 7D show an implementation in which a single testing target 700 (FIG. 7A) is used that includes patterns of different testing tiles 701, 702. As shown in FIG. 7B, different image sensors in the same plane (labeled 1, 2, 3, and 4 in FIG. 7B and arranged in a 2D-matrix, as shown) may view different parts of testing target 700, e.g., part 704, 705, 706 and 707. As a result of the patterning the image seen by sensors 1 and 4 will be image 709 (FIG. 7C) and the image seen by sensors 2 and 3 will be image 710 (FIG. 7D). Although the images shown in FIGS. 7C and 7D are not identical, they each contain enough tiled information at appropriate distances and angles to the sensors for appropriate testing to be performed from images taken of the tiles. As noted above, a computer program may distinguish information in the different types of tiles and initiate the testing.

The example implementations are described using testing targets to test a camera module having a sharpness in the 500 to 700 lp/ph range. However, the matrix testing targets described herein are not limited to use in this sharpness range. Rather, any appropriate portions of a testing target, to test any available sharpness range, may be extracted and used to generate a tiled matrix testing target for testing a camera module in a corresponding sharpness range.

Furthermore, matrix testing targets may be generated for, and used for, color testing. Color testing targets may be tiled in the manner described herein and placed in relation to corresponding camera modules for testing as described herein. Matrix targets for testing other optical properties (besides color and sharpness) may also be generated. In addition, a combined matrix target for testing, e.g., color and sharpness at the same time may be generated and used to test multiple camera modules in parallel (e.g., concurrently).

The example implementations are described using ISO-12233 standard testing targets, and portions thereof. However, the matrix testing targets described herein are not limited to use with information from ISO-12233 standard testing targets. Rather, any appropriate portion or portions of any type of standard or non-standard testing target may be incorporated into tiles that are used to build a matrix testing target of the type described herein.

The matrix tiles described herein are not limited to use with testing systems that move camera modules from station to station. Rather, the matrix testing targets can be used in any appropriate testing system. For example, the matrix testing targets can be used with a test system in which camera modules remain stationary and the targets move from module-to-module. Alternatively, the matrix testing targets can be used in a testing system in which neither the testing targets nor the camera modules move. Rather, the matrix testing targets can be used in a test system in which the camera modules and/or testing targets remain stationary, but either or both are replaced to test different camera modules and/or to perform different types of tests. Replacement of the testing targets and/or camera modules may be performed manually or via computer-controlled robot(s).

Any one or more features described in this disclosure may be combined with any one or more feature described in U.S. patent application Ser. No. 13/775,919, filed concurrently herewith and entitled "Rotatable Camera Module Testing System", the contents of which are incorporated herein by reference as if set forth in full. For example, the testing targets described herein may be used in the rotatable camera module testing systems described in the "Rotatable Camera Module Testing System" application.

Features described herein (e.g., control of test wheel rotation, movement of camera modules from station-to-station in a linear test system of the type shown in FIG. 1, generating matrix targets, including extracting information and tiling, and so forth) can be implemented, at least in part, via a computer program product, e.g., a computer program tangibly embodied in one or more information carriers, e.g., in one or more tangible, non-transitory machine-readable storage media, for execution by, or to control the operation of, data processing apparatus, e.g., one or more programmable processor, a computer, or multiple computers A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the control features can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

Elements of different implementations described herein may be combined to form other implementations not specifically set forth above. Other implementations not specifically described herein are also within the scope of the following claims.

What is claimed is:

1. A system for testing camera modules, comprising:
a structure for holding camera modules under test, each of the camera modules comprising an image sensor, the camera modules being arranged in a same plane on the structure and offset from each other in the plane; and
a target for use in testing the camera modules concurrently, the target comprising multiple tiles comprising patterns that are repeated in two dimensions so that the same information is viewable by different camera modules in two dimensions, each tile containing information for use in testing a camera module, the camera modules and the tiles being arranged so that different camera modules face different tiles but see same information at the same angle;
wherein, of the camera modules, a first camera module faces a first set of tiles and a second camera module faces a second set of tiles, the first set of tiles and the second set of tiles overlapping in two dimensions.

2. The system of claim 1, wherein the tiles are configured to test image sharpness.

3. The system of claim 1, wherein the tiles are configured to test one or more colors of an image.

4. The system of claim 1, wherein the camera modules are arranged in a two-dimensional array on the structure.

5. The system of claim 1, wherein the tiles are repeated along two dimensions of the target.

6. The system of claim 1, wherein each tile comprises parts of an ISO-12233 sharpness testing target, the parts corresponding to a type of the camera modules.

7. The system of claim 1, wherein the structure is rotatable, an axis of rotation of the structure being parallel to a ground plane.

8. The system of claim 1, wherein the structure is rotatable, an axis of rotation of the structure being perpendicular to a ground plane.

9. The system of claim 1, wherein the structure is part of a linear test system.

10. The system of claim 1, wherein different tiles contain different information, the tiles with different information being arranged in one or more patterns so that the different camera modules can see at least parts of patterns of tiles containing the same information at the same angle.

11. The system of claim 1, wherein all tiles contain the same information.

12. A target for testing camera modules, comprising:
multiple tiles that are repeated in two dimensions so that a same pattern is repeated in two dimensions and is viewable by different camera modules in two dimensions, each tile containing information for use in testing a camera module, the tiles being arranged relative to each other so that different camera modules can face different tiles but see the same information at the same angle;
wherein the multiple tiles comprise a first set of tiles to face a first camera module and a second set of tiles to face a second camera module, the first set of tiles and the second set of tiles overlapping in two dimensions.

13. The target of claim 12, wherein the tiles are configured to test image sharpness.

14. The target of claim 12, wherein the tiles are configured to test one or more colors of an image.

15. The target of claim 12, wherein the camera modules are arranged in a one-dimensional array on a structure.

16. The target of claim 12, wherein the camera modules are arranged in a two-dimensional array on a structure.

17. The target of claim 12, wherein the tiles are repeated along two dimensions of the target.

18. The target of claim 12, wherein each tile comprises parts of an ISO-12233 sharpness testing target, the parts corresponding to a type of the camera modules.

19. The target of claim 12, wherein different tiles contain different information, the tiles with different information being arranged in one or more patterns so that different camera modules can see at least parts of patterns of tiles containing the same information at the same angle.

20. The target of claim 12, wherein all tiles contain the same information.

* * * * *